United States Patent
Hashimoto (10) Patent No.: US 9,110,618 B2
(45) Date of Patent: Aug. 18, 2015

(54) PRINTING APPARATUS AND LOG RECORDING METHOD

(71) Applicant: Naoki Hashimoto, Nagoya-shi (JP)

(72) Inventor: Naoki Hashimoto, Nagoya-shi (JP)

(73) Assignee: BROTHER KOGYO KABUSHIKI KAISHA, Nagoya-Shi, Aichi-Ken (JP)

( * ) Notice: Subject to any disclaimer, the term of this patent is extended or adjusted under 35 U.S.C. 154(b) by 0 days.

(21) Appl. No.: 14/039,109

(22) Filed: Sep. 27, 2013

(65) Prior Publication Data

US 2014/0092437 A1   Apr. 3, 2014

(30) Foreign Application Priority Data

Oct. 3, 2012   (JP) .................................. 2012-221059

(51) Int. Cl.
*G06K 15/00* (2006.01)
*G06F 3/12* (2006.01)
*H04N 1/00* (2006.01)

(52) U.S. Cl.
CPC ............ *G06F 3/1273* (2013.01); *G06F 3/1207* (2013.01); *G06F 3/1211* (2013.01); *G06F 3/1285* (2013.01)

(58) Field of Classification Search
CPC ... G06F 3/1258; G06F 3/1259; G06F 3/1273; G06F 3/1203; G06F 3/1207; G06F 21/608; G06F 11/3065; G06F 11/3476; G06F 11/3438; G06F 17/30368; G06F 17/40; G06F 3/1211; G06F 3/1285; H04N 1/00875; H04N 1/00877; H04L 41/069

USPC .......... 358/1.11–1.18, 1.1, 1.9, 2.1, 400–404, 358/434; 714/723, E11.204
See application file for complete search history.

(56) References Cited

U.S. PATENT DOCUMENTS

| | | | |
|---|---|---|---|
| 2006/0279764 A1* | 12/2006 | Shimada | 358/1.14 |
| 2007/0013938 A1* | 1/2007 | Itagaki | 358/1.14 |
| 2007/0143361 A1* | 6/2007 | Arai et al. | 707/202 |
| 2008/0192271 A1* | 8/2008 | Kato et al. | 358/1.9 |
| 2009/0273805 A1* | 11/2009 | Nakagawa | 358/1.15 |
| 2010/0245902 A1* | 9/2010 | Sugiyama | 358/1.15 |
| 2010/0315674 A1* | 12/2010 | Shimizu | 358/1.15 |
| 2012/0033244 A1* | 2/2012 | Kohno | 358/1.14 |

FOREIGN PATENT DOCUMENTS

| | | |
|---|---|---|
| JP | 2008-033615 A | 2/2008 |
| JP | 2010-224950 A | 10/2010 |

* cited by examiner

*Primary Examiner* — Chad Dickerson
(74) *Attorney, Agent, or Firm* — Scully, Scott, Murphy & Presser, P.C.

(57) ABSTRACT

A printing apparatus including: a storage unit configured to store print data; a printing unit configured to print the print data; and a control device configured to, suspend, when a suspension condition of suspending the printing of the print data by the printing unit is satisfied, the printing of the print data until the suspension condition is not satisfied, and store a log related to the print data in a storage device, wherein, when the suspension condition is satisfied, the control device is configured to store the log in the storage device before the printing of the print data is started, and wherein, when the suspension condition is not satisfied, the control device is configured to store the log in the storage device after the printing of the print data is started.

11 Claims, 7 Drawing Sheets

| PRINT DATA ID (55) | ATTRIBUTE INFORMATION (56) ||||| PRINT IMAGE (57) | STATUS (58) |
| --- | --- | --- | --- | --- | --- | --- | --- |
| | PRINTING APPARATUS NAME | USER NAME | RECEPTION DATE | PRINTING SETTING | ... | | |
| ID-1 | MFP-A | USER α | y/m/d | SETTING 1 | ... | File1.jpg | PRINTING IS OVER |
| ID-2 | MFP-B | USER β | y/m/d | SETTING 2 | ... | File2.jpg | PRINTING IS CANCELLED |
| ID-3 | MFP-A | USER α | y/m/d | SETTING 1 | ... | File3.jpg | 4 |
| | | | | | | | BEFORE THE START OF PRINTING |

PRINTING APPARATUS AND LOG RECORDING METHOD

CROSS-REFERENCE TO RELATED APPLICATIONS

This application claims priority from Japanese Patent Application No. 2012-221059 filed on Oct. 3, 2012, the entire contents of which are incorporated herein by reference.

TECHNICAL FIELD

Aspects of the invention relate to a printing apparatus that receives print data and executes printing. More specifically, aspects of the invention relates to a technology of generating a log related to print data.

BACKGROUND

A technology of receiving print data, executing printing and storing, as a log, information of the printing has been suggested. For example, related-art discloses a technology of, when printing print data, storing information, which is specified before the printing, in a server before the printing and storing information, which is specified after the printing, in the server after the printing.

SUMMARY

However, the above technology has a following problem. That is, the log is recorded on condition of the printing execution. Therefore, there is a tendency that when the printing concentrates at a specific time, the recording of the printing log also concentrates at the specific time. When the recording of the printing log concentrates, it may have a bad influence on other processing.

In view of the above, there is provided a printing apparatus and a log recording method capable of reducing concentration of a log recording.

According to an aspect of the present invention, there is provided a printing apparatus including: a storage unit configured to store print data; a printing unit configured to print the print data; and a control device configured to, suspend, when a suspension condition of suspending the printing of the print data by the printing unit is satisfied, the printing of the print data until the suspension condition is not satisfied, and store a log related to the print data in a storage device, wherein, when the suspension condition is satisfied, the control device is configured to store the log related to the print data in the storage device before the printing of the print data is started, and wherein, when the suspension condition is not satisfied, the control device is configured to store the log related to the print data in the storage device after the printing of the print data is started.

According to another aspect of the present invention, there is provided a log recording method of recording a log related to print data that is stored in a storage unit of a printing apparatus, the method including: storing the log related to the print data in a storage device before printing of the print data is started, when a suspension condition of suspending the printing of the print data is satisfied, and storing the log related to the print data in the storage device after the printing of the print data is started, when the suspension condition is not satisfied.

According to the invention, a printing apparatus and a log recording method capable of reducing concentration of a log recording are implemented.

DETAILED DESCRIPTION

Hereinafter, an illustrative embodiment implementing the printing apparatus of the invention will be specifically described with reference to the accompanying drawings. In this illustrative embodiment, the invention is applied to a complex machine (MFP; Multi Function Peripheral) having an image reading function and an image forming function.

[Schematic Configuration of System]

Figure 1:
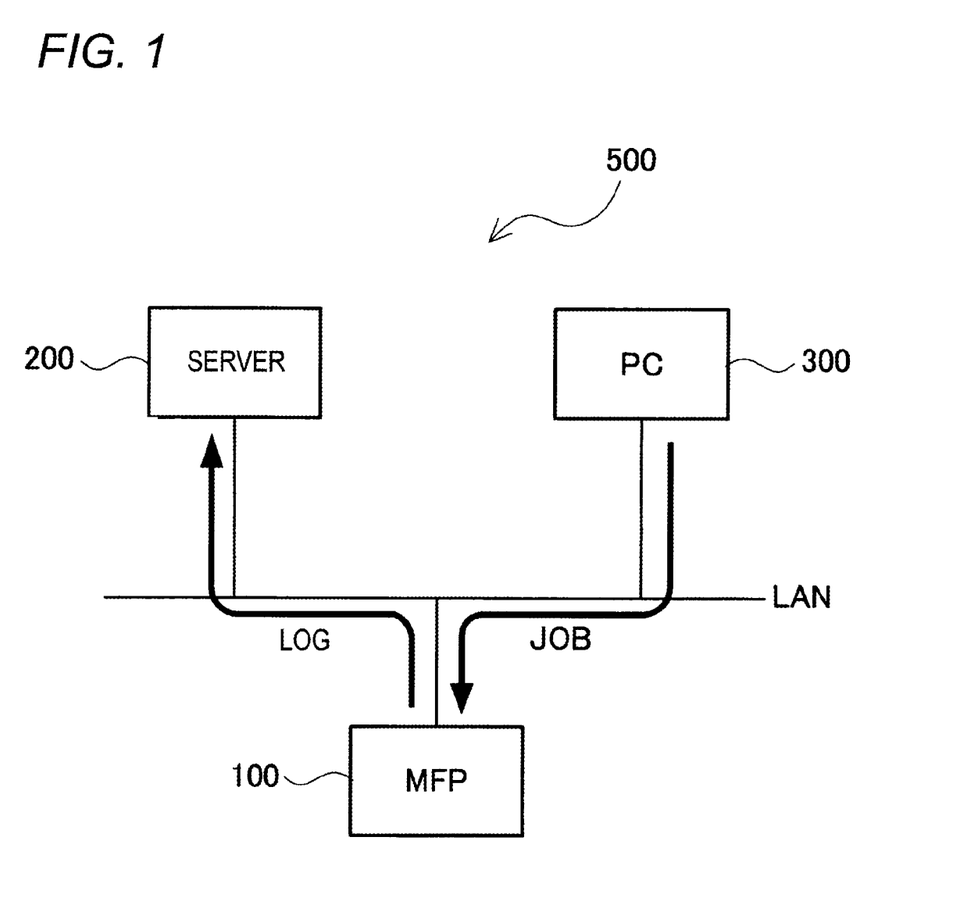
FIG. 1 is a schematic configuration view showing a printing system including an MFP according to an illustrative embodiment.

As shown in FIG. 1, an MFP 100, a server 200 and a PC 300 are connected to each other, there by configuring a printing system 500. In this illustrative embodiment, the MFP 100 is an example of the printing apparatus and the server 200 is an example of the storage device.

A user operates the PC 300 to thus transmit print data to the MFP 100. The MFP 100 receives the print data from the PC 300 and executes printing based on the received print data.

Also, the MFP 100 generates a log related to the received print data and transmits the same to the server 200. The log transmitted by the MFP 100 is stored in a memory device included in the server 200. The log related to the print data includes attribute information about attributes of the print data, a print image of the print data, and the like.

[Electrical Configuration of MFP]

Subsequently, electrical configurations of the MFP 100 and the server 200 are described with reference to FIG. 2. The MFP 100 has a control device 30 having a CPU 31, a ROM 32, a RAM 33 and an NVRAM (non-volatile RAM) 34. The control device 30 is electrically connected to an image forming unit 1, an image reading unit 2, an operation panel 40, a network IF 37 and a USB IF 38.

The image forming unit 1 executes printing on a sheet and the like, based on the print data. An image forming method of the image forming unit 1 may be an electrophotographic method or inkjet method, for example. The image forming unit 1 is an example of the printing unit. The image reading unit 2 reads an image of a document. The image reading unit 2 has an image sensor that illuminates light towards the document and converts reflected light from the document into an electric signal to thereby output image data of the document, for example.

The operation panel 40 includes a touch panel, a ten-key keypad, an input button and the like. The operation panel 40 receives an operation that is made by a user and displays information for the user. The network IF 37 is connected to a network such as LAN. The MFP 100 can perform data communication with other information processing apparatus such as the server 200 and the PC 300 through the network IF 37. The MFP 100 transmits a log related to the print data to the server 200 through the network IF 37. Also, the MFP 100 can perform data communication with other information processing apparatus such as the PC 300 through the USB IF 38.

The control device 30 plays a key role on the control of the MFP 100. The CPU 31 of the control device 30 executes calculations for implementing a variety of functions such as an image reading function, an image forming function and the like. The CPU 31 carries out image processing for the print data, which is received via the network IF 37 or USB IF 38, or image data, which is read with the image reading unit 2, in response to a program read out from the ROM 32 and enables the image forming unit 1 to execute printing. Also, the CPU 31 executes suspension processing of suspending printing of the print data in accordance with a suspension condition, log generation processing of generating a log related to the print data and storing processing of transmitting the generated log to the server 200. These processing will be described later. The CPU 31 is an example of the control device.

In the ROM 32, a variety of control programs for controlling the image forming unit 1 and the like, a variety of settings, initial values and the like are stored. The RAM 33 is used as a work area to which the control programs are loaded or a storage area in which various data is temporarily stored. For example, the print data that is received through the network IF 37 and the like is stored in the RAM 33 until the printing is completed. The RAM 33 is an example of the storage unit. The NVRAM 34 is a non-volatile storage member and is used as a storage area in which a variety of data and the like are saved.

Figure 2:
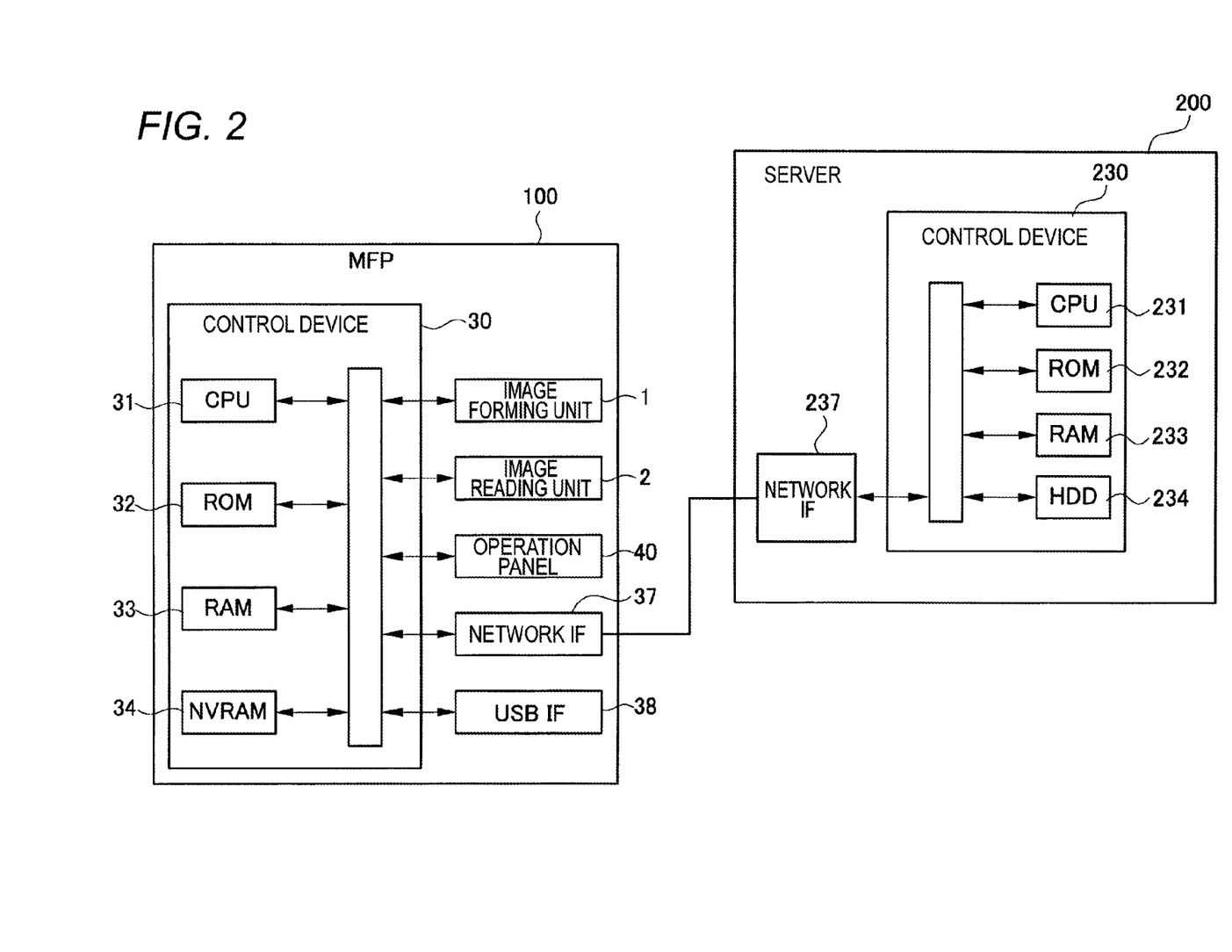
FIG. 2 is a block diagram showing electrical configurations of the MFP and a server.

Also, as shown in FIG. 2, the server 200 has a control device 230 having a CPU 231, a ROM 232, a RAM 233 and an HDD 234. The control device 230 is electrically connected to a network IF 237. The network IF 237 of the server 200 is connected to the network IF 37 of the MFP 100 through the network such as LAN. The server 200 stores the log, which is received from the MFP 100 through the network IF 237, in the HDD 234. The HDD 234 is an example of the storage device.

[Suspension Condition]

The print data includes suspension print data to which a suspension condition of suspending printing is added and non-suspension print data to which a suspension condition is not added. When the MFP 100 receives non-suspension print data, the MFP immediately starts printing of the print data. On the other hand, when the MFP 100 receives suspension print data, the MFP suspends printing based on the print data while a suspension condition is satisfied and starts the printing after a suspension condition is not satisfied.

The suspension print data includes secure print data, time designation print data and the like, for example. The secure print data is print data for which a password permitting printing is set. When a user inputs a password, which is set for the print data, through the operation panel 40 of the printing apparatus, the MFP 100 starts printing. That is, while the password is not input, the MFP 100 suspends the printing. For the secure print data, a state where a password permitting printing of print data is not input is the suspension condition. By inputting the password, the suspension condition becomes not satisfied.

The time designation print data is print data to which a designated time at which printing is to be started is designated beforehand. While the designated time has not been reached, the MFP 100 suspends the printing. For the time designation print data, a state where the designated time, at which the printing of the print data is permitted, has not been reached is the suspension condition. When reaching the designated time, the suspension condition becomes not satisfied.

[Log Related to Print Data]

Figure 3:
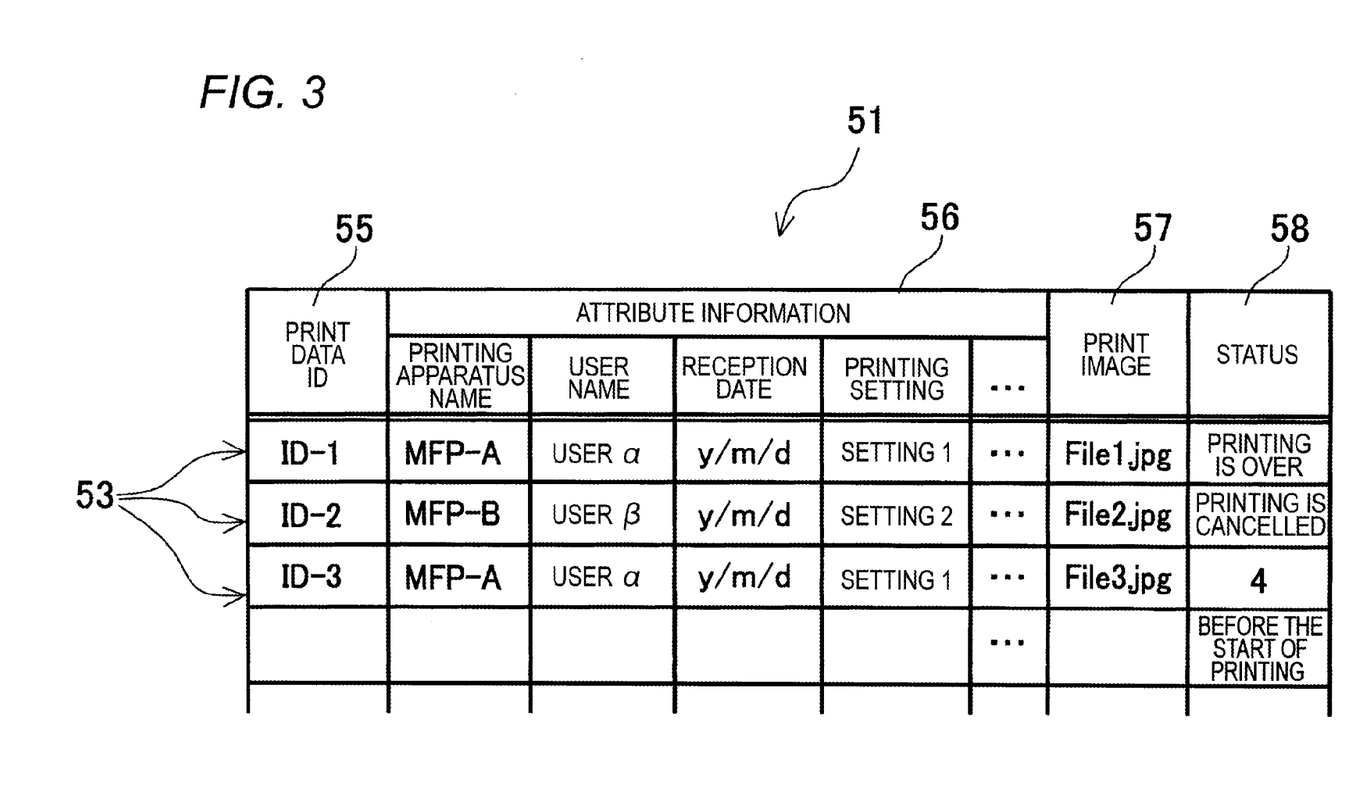
FIG. 3 illustrates an example of a log.

Next, a log that is generated by the MFP 100 is described. As shown in FIG. 3, the log is stored in a database 51 that is provided to the HDD 234 of the server 200. In the database 51, log records 53 that are generated for each print data are stored. The log record 53 includes a print data ID 55, attribute information 56, a print image 57 and status information 58 of each print data.

The print data ID 55 is a code for identifying each print data. Also, the attribute information 56 is information about attributes of the print data, which includes a printing apparatus name, a user name, a reception data, a printing setting and the like. In the meantime, the printing setting is a setting of the MFP 100 related to printing and includes information such as a printing sheet, a printing direction, a printing size, color/monochrome, duplex/one-side and the like. The print image 57 is information of an image that is printed based on the print data.

The print image 57 is image data that can visualize an image to be printed on a sheet and the like. For example, the print image may be image data having a general format such as bitmap, JPEG and the like, or data obtained by processing the image data, such as thumbnail. Also, the status information 58 is information that indicates a progressing status related to the printing of image data at generation time of a log. The status information 58 is an example of the identification information.

The progressing status that is stored in the status information 58 includes 'before the start of printing', 'printing is over', 'printing is cancelled', 'being stopped' and the like. A manager of the log can perceive whether the information of the log record 53 is information before the start of printing of the print data or after the start of the printing by the status information 58.

The 'before the start of printing' of the status information 58 means that the attribute information 56 and the print image 57 of the log record 53 are information before the start of the printing. For example, there is a log that is generated and stored before the printing based on the print data starts. The 'printing is over' of the status information 58 means that the printing of the print data of the log record 53 has finished. That is, the log record 53 in which the status information 58 is 'printing is over' is information after the start of the printing of the print data for which the printing is over.

Also, the 'printing is cancelled' of the status information 58 means that an instruction to cancel printing is received while the printing of the print data is not completed. For example, there is a case where an instruction to cancel printing is received before a suspension condition is satisfied after the suspension print data is received, a case where an instruction to cancel a remaining printing is received before the printing is completed after the printing execution starts, and the like. The attribute information 56 and the print image 57 of the log record 53 in which the status information 58 is 'printing is cancelled' are information related to the print data before the cancel.

Also, the 'being stopped' of the status information 58 means that storing of a log is not completed. The storing of a log may be stopped during the storing so as to execute processing having a higher priority, for example. In this case, the status information 58 of 'being stopped' is added to the log record 53 that has been stored until the storing is stopped.

[Log Generation Processing]

Next, log generation processing that is executed by the CPU 31 of the MFP 100 is described with reference to a flow chart of FIG. 4. The log generation processing is executed when the MFP 100 receives print data. In the meantime, the reception of the print data includes a case where a printing instruction is received from the PC 300 through the network IF 37 and a case where a copy instruction is received through the operation panel 40.

When this processing starts, the CPU 31 determines whether a suspension condition is satisfied for the received print data (S101). For example, when the received print data is the suspension print data having a suspension condition added thereto, the CPU 31 determines that the suspension condition is satisfied (S101: YES).

Alternatively, even when the print data is the non-suspension print data, if the MFP 100 satisfies the suspension condition, the CPU 31 determines that the suspension condition is satisfied (S101: YES). For example, there is a case where printing cannot be immediately performed because disposables such as toner and sheet are insufficient or a sheet jamming occurs. Even when the printing is suspended due to a situation of the MFP 100, the CPU 31 determines that the suspension condition is satisfied.

When it is determined for the received print data that the suspension condition is not satisfied (S101: NO), the CPU 31 immediately starts printing. For example, there is a case where the received print data is non-suspension print data having no suspension condition added thereto and the MFP 100 does not have any reason to suspend printing.

Specifically, when the suspension condition is not satisfied, the CPU 31 first develops the print data described by a PDL and the like into image data of a bitmap format and the like (S103). Subsequently, the CPU enables the image forming unit 1 to print the developed image data (S105). Thereby, a printed material is output.

Also, the CPU 31 generates a log related to the print data (S107). That is, the CPU generates the log record 53 including the print data ID 55, the attribute information 56, the print image 57 and the status information 58 and records the information about the print data into the log record 53. The status information 58 is 'printing is over'. In the meantime, the log generation (S107) may be carried out in parallel with the printing (S105).

When the printing and the log generation are completed, the CPU 31 transmits the generated log to the server 200 so that the server stores the same in the database 51 (S109). When the log is transmitted, the CPU 31 ends the log generation processing. In the meantime, the server 200 receives the transmitted log and stores the same in the database 51.

On the other hand, when it is determined for the received print data that the suspension condition is satisfied (S101: YES), the CPU 31 does not immediately start printing. The printing of the print data is suspended until the suspension condition is released. For example, when the print data is the suspension print data having a suspension condition or when the MFP 100 has a reason to suspend the printing, the CPU suspends the printing until the suspension condition is not satisfied.

While the printing is suspended, the CPU 31 performs developing processing for the print data (S111). The developing processing of the image is the same processing as the developing processing of the image that is performed in S103 so as to execute printing. When the printing is suspended, the CPU 31 stores all of the image data acquired by the developing into the RAM 33.

Then, the CPU 31 generates a log related to the print data (S113). The generated log record 53 is the same as that generated in S107. However, the print image 57 is the image data acquired in S111 and the status information 58 is 'before the start of printing'.

Also, the CPU 31 transmits the generated log to the server 200 and executes suspension printing processing of executing the printing being suspended (S115). The suspension printing processing will be described later. When the suspension printing processing is over, the CPU 31 ends the log generation processing.

In the meantime, even while the CPU 31 is executing the processing of S111 or S113, when the suspension condition is not satisfied, the CPU immediately starts the printing. That is, when the image is being developed (S111), if the image developing is over, the CPU starts the printing (S105). Alternatively, when the log is being generated (S113), the CPU stops the log generation and starts the printing (S105). After the printing is over, the CPU executes the processing of S107 and S109. Then, before the log is transmitted, the CPU changes the status information 58 into 'printing is over'.

[Suspension Printing Processing]

Figure 4:
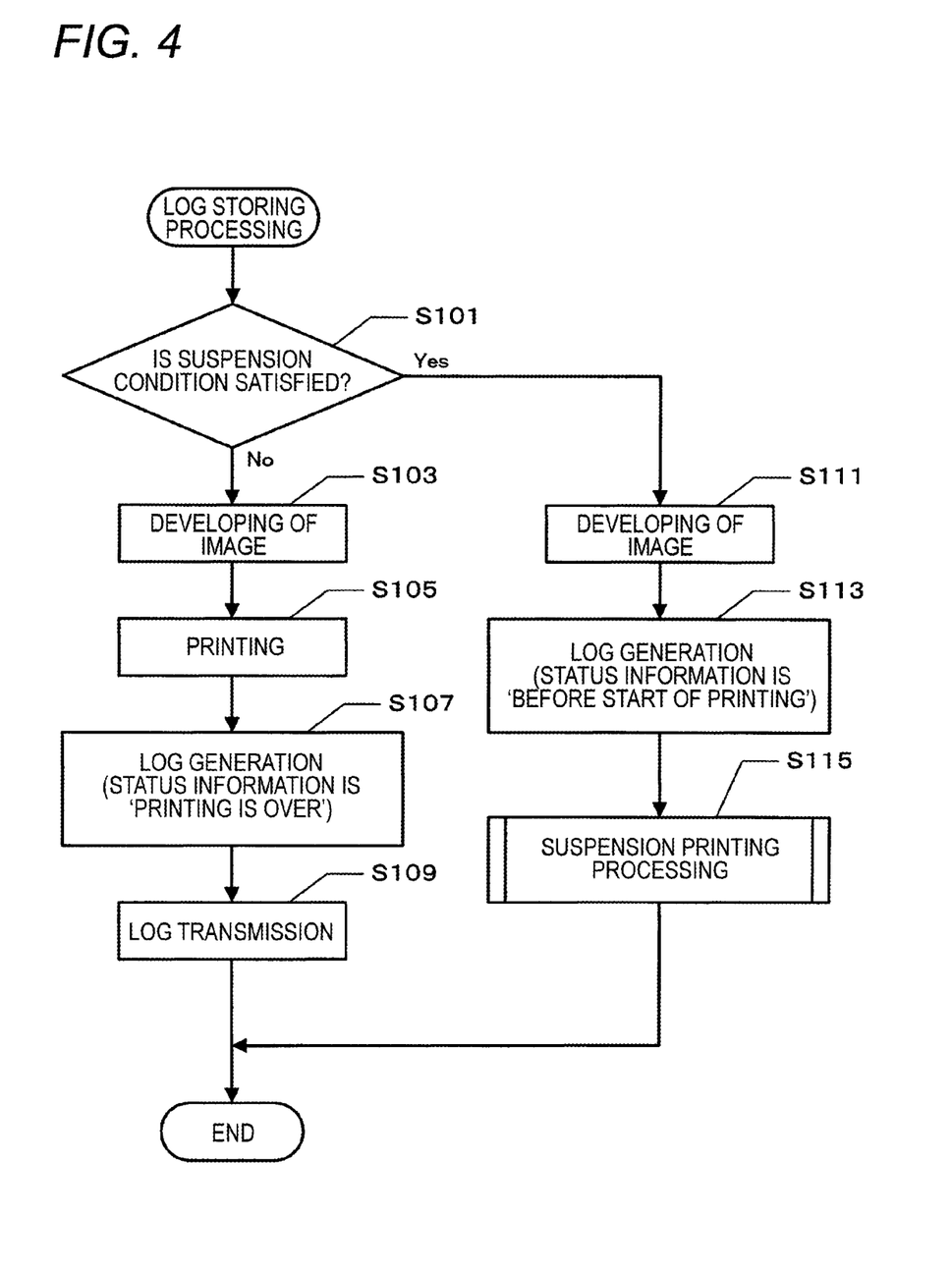
FIG. 4 is a flow chart showing log storing processing.
Figure 5:
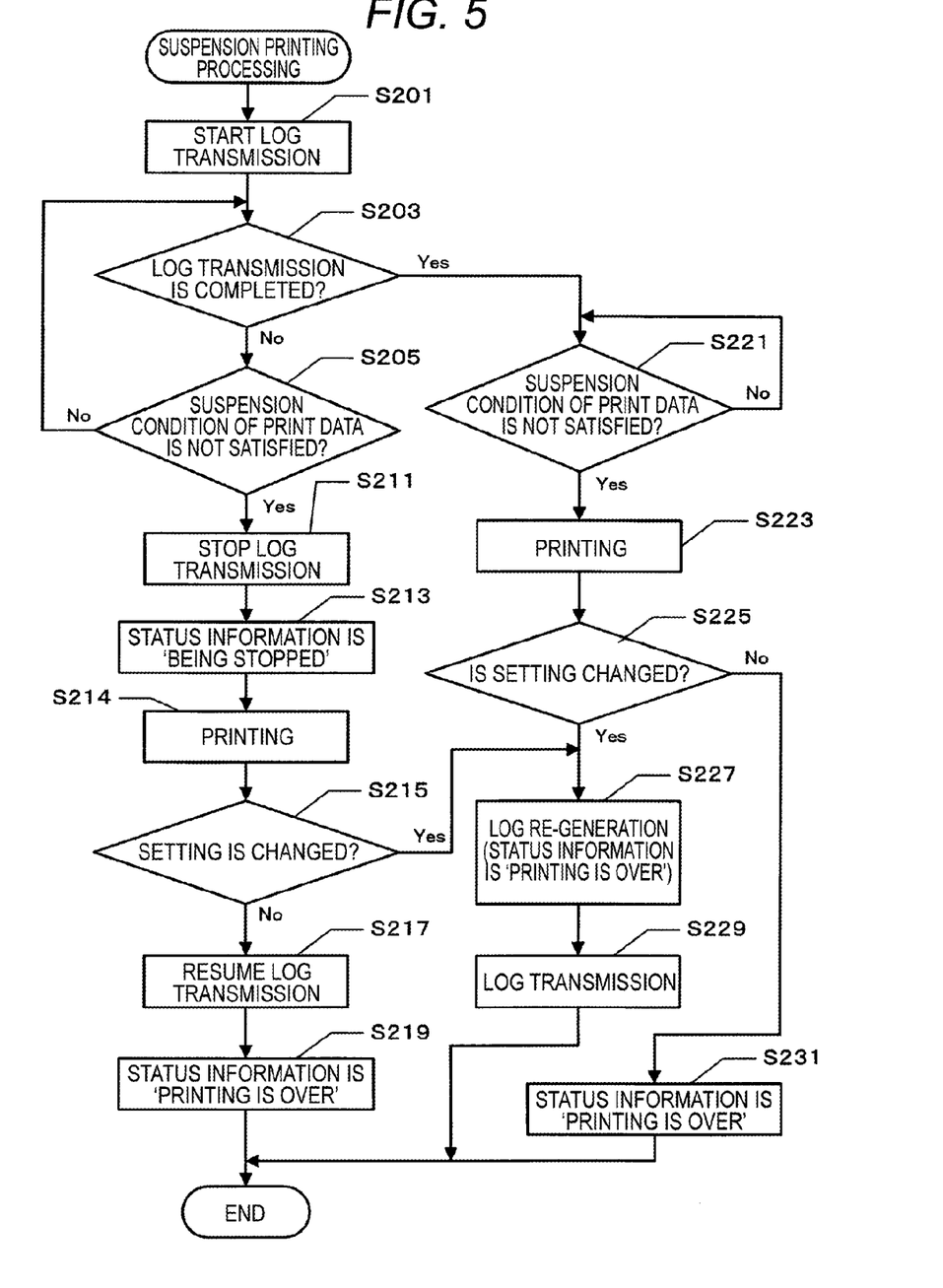
FIG. 5 is a flow chart showing suspension printing processing.

Next, the suspension printing processing that is executed in S115 of FIG. 4 is described with reference to FIG. 5.

When the execution of the suspension printing processing starts, the CPU 31 first starts to transmit the log generated in S113 to the server 200 (S201). The status information 58 at this time is 'before the start of printing'. Then, the CPU determines whether the log transmission is over (S203).

When the log transmission is not over (S203: NO), the CPU determines whether the suspension condition of the print data is satisfied (S205). When the state where the suspension condition is satisfied is maintained (S205: NO), the CPU keeps transmitting the log (S203).

On the other hand, while the log transmission is not over (S203: NO), when the suspension condition of the print data is not satisfied (S205: YES), the CPU stops the log transmission (S211). Then, the CPU 31 re-records the status information 58 of the log record 53, which is halfway transmitted to the server 200, into 'being stopped' (S213). Accordingly, the CPU 31 prepares a command set to re-record the status information 58 into 'being stopped', for example, and transmits the same to the server 200. The command set is added with the print data ID 55. Hereinafter, the re-recording of the status information 58 means that a command set is transmitted from the CPU 31 to the server 200.

Subsequently, the CPU 31 enables the image forming unit 1 to print the print data for which the suspension condition is not satisfied (S214). After the printing is completed, the CPU determines whether the setting is changed (S215). When the setting is changed, it means that a password is input and the printing setting is changed for the secure print data, for example. A user can change the printing setting such as color/monochrome and sheet selection by operating the operation panel 40 after the print data is transmitted.

When the printing setting is not changed (S215: NO), the log that is being transmitted halfway is effective as it is. Thus, the CPU resumes the log transmission after the printing is over, thereby transmitting a rest of the log (S217). When the log transmission is over, the CPU enables the server 200 to re-record the status information 58 of the log into 'printing is over' (S219) and ends the suspension printing processing.

On the other hand, when the printing setting is changed (S215: YES), it is preferable to change the attribute information 56 and print image 57 of the log that is being transmitted halfway. Therefore, the CPU changes the attribute information 56 into a new printing setting to thus generate a new log (S227). The status information 58 of this log is 'printing is over'. Subsequently, the CPU transmits the re-generated log to the server 200 (S229). That is, the CPU destroys the log already transmitted and overwrites the new log. When the log transmission is over, the CPU ends the suspension printing processing.

On the other hand, when the suspension condition is satisfied for the print data (S205: NO) and the log transmission is over (S203: YES), the CPU 31 further determines whether the suspension condition of the print data is not satisfied (S221). When the suspension condition of the print data is still satisfied (S221: No), the CPU stands by until the suspension condition is not satisfied.

When the suspension condition of the print data is not satisfied (S221: YES), the CPU enables the image forming unit 1 to execute the printing (S223). When the printing is completed, the CPU determines whether the setting is changed (S225). This is the same determination as that performed in S215. When the printing setting is not changed (S225: NO), the CPU has only to change the status information 58 of the transmitted log. The CPU 31 enables the server 200 to re-record the status information 58 to 'printing is over' (S231) and then ends the suspension printing processing.

On the other hand, when the printing setting is changed (S225: YES), the CPU executes the same processing as the processing that is performed when a result of the determination in S215 is YES. That is, the CPU changes the attribute information 56 and the print image 57 to thus generate a new log (S227) and transmits the re-generated log to the server 200 so that the server overwrites the same (S229). When the log transmission is over, the CPU ends the suspension printing processing.

[Printing Cancel Processing]

Next, the printing cancel processing that is executed when the printing is cancelled after the print data is received is described with reference to FIGS. 6 and 7. This processing is executed when an instruction to cancel the printing is received from a user.

After transmitting the print data to the MFP 100, the user of the MFP 100 can input an instruction to cancel the printing to the MFP 100 before the printing starts or before the printing is over even after the printing starts. That is, the cancel includes cancel before the start of printing in which the printing is cancelled before it starts and cancel after the start of printing in which the printing is cancelled after it starts. The manager of a log can select and set in advance whether or not to leave a log of the print data for each of the cancel before the start of printing and the cancel after the start of printing.

Figure 6:
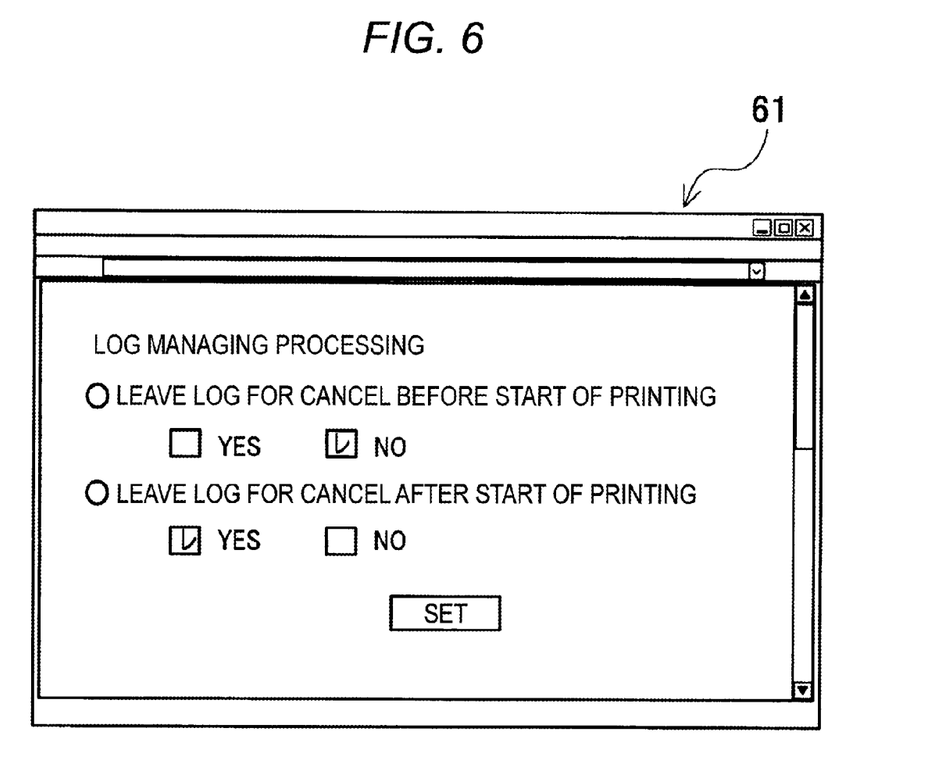
FIG. 6 illustrates an example of a display screen for log managing setting.
Figure 7:
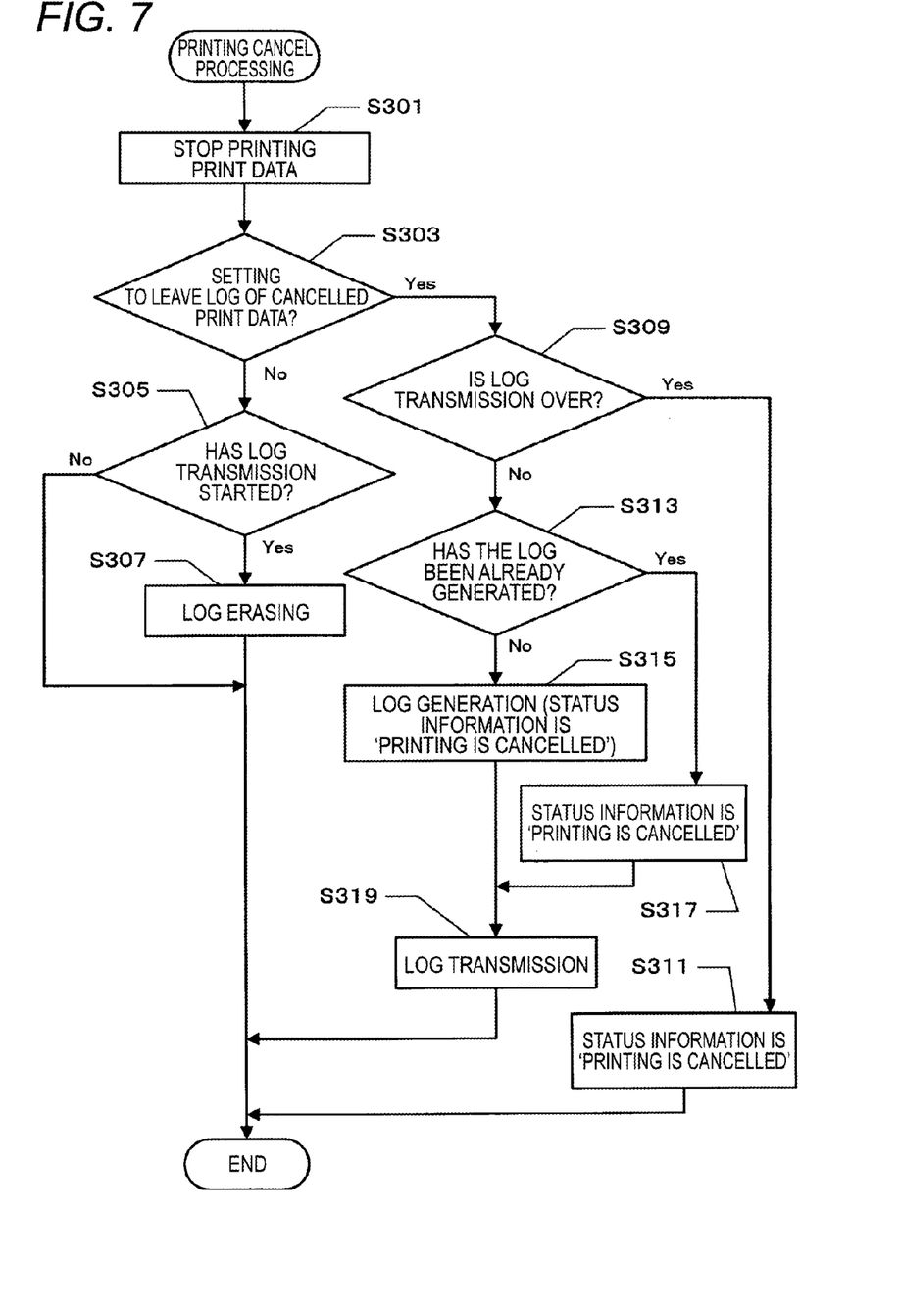
FIG. 7 is a flow chart showing printing cancel processing.

FIG. 6 shows an example of a setting screen 61 of a log managing setting. In the example of FIG. 6, the setting is made so that a log is not left for the cancel before the start of printing and a log is left for the cancel after the start of printing. In the meantime, an example of a window that is displayed on a display of the PC 300 is exemplified as the setting screen 61. However, an input may be received by the operation panel 40 of the MFP 100. The MFP 100 stores the log managing setting, which is designated by the manager and includes the information indicating whether or not to leave the log of the cancelled print data, in the NVRAM 34.

Subsequently, the printing cancel processing is described with reference to FIG. 7. When an instruction to cancel the printing is received from the operation panel 40 or PC 300, the CPU 31 first stops the printing of the print data for which the cancel instruction is received (S301). For example, when printing of print data has not started yet, the CPU prohibits the printing execution so that the print data is not printed. This case corresponds to the cancel before the start of printing. When printing has already started, the CPU cancels the printing and stops subsequent printing execution. This case corresponds to the cancel after the start of printing.

Then, the CPU 31 reads out the log managing setting of the cancelled print data from the NVRAM 34 and determines whether the setting is a setting to leave a log of the cancelled print data (S303). The CPU 31 determines whether the setting is a setting to leave a log of the cancelled print data by the information of the corresponding part of the log managing setting, depending on whether the cancel is the cancel before the start of printing or cancel after the start of printing. When the log managing setting of the MFP 100 is designated as shown in FIG. 6, for example, the CPU determines that a log is not left if the cancel is the cancel before the start of printing and determines that a log is left if the cancel is the cancel after the start of printing.

When it is determined that the setting is a setting not to leave the log (S303: NO), the CPU 31 determines whether the log transmission has already started (S305). When the log transmission has not yet started (S305: NO), the CPU ends the printing cancel processing.

On the other hand, when the log transmission has already started (S305: YES), the CPU erases the transmitted log (S307). To this end, the CPU 31 transmits an instruction to erase the log of the print data to the server 200. Since the print data ID 55 is added to the instruction, the server 200 can specify the log record 53 that is an erasing target. When the log erasing is instructed, the CPU 31 ends the printing cancel processing.

On the other hand, when it is determined that the setting is a setting to leave the log (S303: YES), the CPU 31 determines whether the log transmission has already ended (S309). When the log transmission has already ended (S309: Yes), the CPU transmits a command to re-record the status information 58 of the log to 'printing is cancelled' to the server 200 (S311). Then, the CPU 31 ends the printing cancel processing.

On the other hand, when the log transmission has not yet ended (S309: NO), it is necessary to transmit the log to the server 200. Therefore, the CPU determines whether the log generation has ended (S313). When the log generation has not ended (S313: No), the CPU generates the log (S315). At this time, the CPU records 'printing is cancelled' in the status information 58 of the log.

When the log generation has ended (S313: Yes), the CPU re-records the status information 58 of the generated log to 'printing is cancelled' (S317). Subsequently, the CPU 31 transmits the log generated in S315 or S317 to the server 200 (S319) and ends the printing cancel processing.

As specifically described above, when the suspension condition is satisfied, the MFP 100 of this embodiment suspends the printing of the print data until the suspension condition is not satisfied. Also, when the suspension condition is satisfied, the MFP 100 stores the log related to the print data in the storage device, which is a device of the storing destination of the log, before starting the printing of the print data. On the other hand, when the suspension condition is not satisfied, the MFP starts the printing of the print data and then stores the log related to the print data in the storage device. Like this, the storing timing of the log of the print data is different depending on whether the suspension condition is satisfied. Thereby, compared to a configuration where only the printing execution is a storing condition of the log, the concentration of the log recording can be reduced. As a result, the timings of the printing and the log recording are dispersed, so that it may be possible to reduce the load.

In the meantime, the above illustrative embodiment is just exemplary and does not limit the invention. Therefore, the invention can be variously improved and modified without departing from the scope of the invention. For example, the invention is not limited to the MFP and can be also applied to any apparatus having an image forming function such as a printer, a copier, a scanner, a FAX and the like.

For example, the configuration of the log is not limited to the above example. The log may include at least one of the attribute information of the print data and the print image thereof and need not include the status information 58. When the status information 58 is not included in the log, the recording sequence of the status information 58 upon the log generation and the sequence related to the change of the status information 58 about the transmitted log are not necessary. In the meantime, when the status information 58 is included, it is possible to perceive an actual situation upon the log generation. Also, when the status information 58 is changed to meet the actual situation, the utility of the log is further improved.

Also, for example, in the above illustrative embodiment, the entire log record 53 including the status information 58 is one log. However, the invention is not limited thereto. The status information 58 may be information that is managed separately from the log in relation with the log, not a portion of the log. For example, the status information 58 may be a database that is managed by the print data ID 55, separately from the log.

Also, for example, in the above illustrative embodiment, when there is a change in the status of the print data, the CPU 31 transmits the command to re-record the status information 58 to the server 200. However, the invention is not limited thereto. Not only the status information 58 but also the entire log record 53 may be updated or a log having different status information 58 may be newly added. Also, for example, in the above illustrative embodiment, the log is stored in the HDD 234 of the server 200. However, the log may be stored in an embedded memory device such as NVRAM 34 of the MFP 100.

In the above illustrative embodiment, even when the print data includes a plurality of pages, one log is generated for each print data, and is transmitted collectively. However, a log may be generated and transmitted page-by-page. Particularly, when the suspension condition includes a condition that a problem occurs in the process system or conveyance system, a log is transmitted page-by-page, so that it is possible to take a more finely-tuned response. For example, it may be possible to determine whether the suspension condition is satisfied, whenever a log of one page is transmitted. Also, instead of the MFP 100, the PC may execute the log generation processing, the suspension printing processing and the printing cancel processing. For example, the MFP 100 may be provided with a dedicated PC and the PC may be enabled to execute the respective processing.

The content of the status information 58 is not limited to the above example. For example, the status information may be information simply identifying before the start of printing and after the start of printing. For example, when the suspension condition of the print data for which the suspension condition is satisfied becomes not satisfied and thus the printing starts, the status information 58 may be re-recorded to 'after the start of printing'.

Also, the processing described in the illustrative embodiment may be executed by hardware such as a single CPU, a plurality of CPUs, an ASIC and the like or a combination thereof. Also, the processing described in the illustrative embodiment may be implemented by a variety of aspects such as a recording medium recording a program for executing the processing and a method.

The present invention provides illustrative, non-limiting examples as follows:

(1) In a first aspect, there is provided a printing apparatus including: a storage unit configured to store print data; a printing unit configured to print the print data; and a control device configured to suspend, when a suspension condition of suspending the printing of the print data by the printing unit is satisfied, the printing of the print data until the suspension condition is not satisfied, and store a log related to the print data in a storage device, wherein, when the suspension condition is satisfied, the control device is configured to store the log related to the print data in the storage device before the printing of the print data is started, and wherein, when the suspension condition is not satisfied, the control device is configured to store the log related to the print data in the storage device after the printing of the print data is started.

According to the first aspect, when the suspension condition of suspending the printing of the print data, which is performed by the printing unit, is satisfied, the control device suspends the printing of the print data until the suspension condition is not satisfied and stores the log related to the print data in the storage device before the printing starts. Also, when the suspension condition is not satisfied, the control device starts the printing of the print data and then stores the log related to the print data in the storage device. Here, the log related to the print data may be a print image or attribute information (for example, a user name, a print data identifier, a reception data and a page number). The suspension condition may be, for example, that a password is not input, a designated time is not reached, and a problem occurs in a process system or conveyance system. Also, the print data may be data of one page or data of a plurality of pages. Also, the storage device is not limited to an external apparatus such as a server and may be an embedded memory device.

That is, the printing apparatus makes storing timings of the log of the print data different depending on whether the suspension condition is satisfied. Thereby, the concentration of the log recording is reduced. That is, since the log of the print data for which the suspension condition is satisfied is stored before the printing starts, it is possible to disperse the storing timing of the log. As a result, the concentration of the log recording is reduced.

(2) In a second aspect, there is provided the printing apparatus according to the first aspect, wherein, when storing the log related to the print data in the storage device, the control device is further configured to: store identification information, which includes information identifying a first state that is before the start of the printing of the print data and a second state that is after the start of the printing of the print data, in the storage device in relation with the log.

According to the second aspect, the identification information identifying before or after the start of the printing is also stored, so that the utility of the log is improved. The identification information may be included in the log, as a part of the log, or may be information that is different from the log and is managed in relation with the log such as ID. In the meantime, the identification information may preferably identify at least before or after the start of printing and may include a detailed state of the print data such as 'before the start of printing', 'printing is over', 'printing is cancelled', 'print data is completely erased', 'storing is cancelled' and the like.

(3) In a third aspect, there is provided the printing apparatus according to the second aspect, wherein, when the suspension condition of suspending the printing of the print data, for which the identification information identifying the first state is stored, becomes not satisfied, and thus the printing of the print data is started, the control device is further configured to: store the identification information identifying the second state in the storage device in relation with the log for the print data.

According to the third aspect, it is possible to store a log meeting an actual situation. In the meantime, the control device may overwrite the identification information of the log or may newly add a log.

(4) In a fourth aspect, there is provided the printing apparatus according to the second aspect, wherein the identification information further includes information identifying whether the printing of the print data is cancelled or not, and wherein, when the printing of the print data, for which the identification information identifying the first state is stored, is cancelled, the control unit is further configured to: store the identification information identifying the cancel of the printing in the storage device in relation with the log for the print data.

According to the fourth aspect, it is possible to store a log meeting an actual situation. In the meantime, the control device may overwrite the identification information of the log or may newly add a log.

(5) In a fifth aspect, there is provided the printing apparatus according to the second aspect, wherein, when the printing of the print data, for which the identification information identifying the first state is stored, is cancelled, the control device is further configured to: erase the log related to the print data from the storage device.

According to the fifth aspect, it is possible to store a log meeting an actual situation.

(6) In a sixth aspect, there is provided the printing apparatus according to the second aspect, wherein the log includes a printing setting of the print data, and wherein, when the suspension condition of suspending the printing of the print data, for which the identification information identifying the first state is stored, becomes not satisfied, and thus the printing of the print data is started, and the printing setting included in the log stored in the storage device and a printing setting upon the start of the printing are different, the control device is further configured to: update the printing setting included in the log to the printing setting upon the start of the printing.

According to the sixth aspect, it is possible to store a log meeting an actual situation. In the meantime, it is possible to determine whether the setting is different by determining whether a change of the printing setting is received after storing the log and before starting the printing.

(7) In a seventh aspect, there is provided the printing apparatus according to the first aspect, wherein the log includes a print image of the print data, and wherein, when the suspension condition is satisfied, the control device is further configured to: generate a print image of the print data before the printing is started and store the log including the print image in the storage device.

According to the seventh aspect, the print image is prepared before the start of the printing, so that it is possible to disperse the processing load.

(8) In an eighth aspect, there is provided the printing apparatus according to the first aspect, wherein, when the printing by the printing unit is started while storing the log related to the print data in the storage device, the control device is further configured to: stop storing the log and resume storing the log after the printing is completed.

According to the eighth aspect, when the printing and the log storing are concurrently executed, the processing load is high. Therefore, when the printing is preferentially executed, the parallel execution with the log storing is avoided, so that an increase in the load can be suppressed.

(9) In a ninth aspect, there is provided the printing apparatus according to the first aspect, wherein the suspension condition includes a condition that a password permitting the printing of the print data has not been input.

(10) In a tenth aspect, there is provided the printing apparatus according to the first aspect, wherein the suspension condition includes a condition that a designated time, at which the printing of the print data is permitted, has been reached.

(11) In an eleventh aspect, there is provided a log recording method of recording a log related to print data that is stored in a storage unit of a printing apparatus, the method including: storing the log related to the print data in a storage device before printing of the print data is started, when a suspension condition of suspending the printing of the print data is satisfied, and storing the log related to the print data in the storage device after the printing of the print data is started, when the suspension condition is not satisfied.

According to the eleventh aspect, it is possible to expect that the concentration of the log recording will be reduced. In the meantime, the device of the storing destination of the log may be the printing apparatus or an external apparatus such as PC.

What is claimed is:

1. A printing apparatus comprising:
a storage device configured to store print data;
a printing unit configured to print the print data; and
a control device configured to, receive print data, determine whether a suspension condition of suspending the printing of the received print data by the printing unit is satisfied,
suspend, when it is determined that the suspension condition is satisfied, the printing of the print data until the suspension condition is not satisfied,
perform, when it is determined that the suspension condition is not satisfied, the printing of the print data, and
wherein the control device is configured to control storing timings of a log in the storage device depending on whether the suspension condition is satisfied, the log being related to the print data and including a print image of the print data, such that
when the suspension condition is satisfied, the control device is configured to store the log related to the print data and including the print image in the storage device before the printing of the print data is started, and
when the suspension condition is not satisfied, the control device is configured to store the log related to the print data and including the print image in the storage device after the printing of the print data is started,
wherein, when storing the log related to the print data in the storage device, the control device is further configured to:
store identification information, which includes information identifying a first state that is before the start of the printing of the print data and a second state that is after the start of the printing of the print data, in the storage device in relation with the log;
wherein the identification information further includes information identifying whether the printing of the print data is cancelled or not;
the control device is further configured to:
determine whether or not to generate a log for a cancel of printing during the first state and the second state based on log managing processing settings that are manually set before the printing of the print data is cancelled.

2. The printing apparatus according to claim 1,
wherein, when the suspension condition of suspending the printing of the print data, for which the identification information identifying the first state is stored, becomes not satisfied, and thus the printing of the print data is started, the control device is further configured to:
store the identification information identifying the second state in the storage device in relation with the log for the print data.

3. The printing apparatus according to claim 1,
wherein, when the printing of the print data, for which the identification information identifying the first state is stored, is cancelled, the control unit is further configured to:
store the identification information identifying the cancel of the printing in the storage device in relation with the log for the print data.

4. The printing apparatus according to claim 1,
wherein, when the printing of the print data, for which the identification information identifying the first state is stored, is cancelled, the control device is further configured to:
erase the log related to the print data from the storage device.

5. The printing apparatus according to claim 1
wherein the log includes a printing setting of the print data, and
wherein, when the suspension condition of suspending the printing of the print data, for which the identification information identifying the first state is stored, becomes not satisfied, and thus the printing of the print data is started, and the printing setting included in the log stored in the storage device and a printing setting upon the start of the printing are different, the control device is further configured to:
update the printing setting included in the log to the printing setting upon the start of the printing.

6. The printing apparatus according to claim 1,
wherein, when the suspending condition becomes not satisfied while storing the log related to the print data in the storage device, the control device is further configured to:
stop transmitting the log, perform printing of the print data and resume transmitting the log after the printing is completed.

7. The printing apparatus according to claim 1,
wherein the suspension condition includes a condition that a password permitting the printing of the print data has not been input.

8. The printing apparatus according to claim 1,
wherein the suspension condition includes a condition that a designated time, at which the printing of the print data is permitted, has been reached.

9. A log recording method of recording a log related to print data that is stored in a storage device of a printing apparatus, the log recording method comprising:
receiving print data,
determining whether a suspension condition of suspending printing of the received print data by the printing apparatus is satisfied,
suspending, when it is determined that the suspension condition is satisfied, the printing of the print data until the suspension condition is not satisfied,
performing, when it is determined that the suspension condition is not satisfied, the printing of the print data,
controlling storing timings of a log in the storage device depending on whether the suspension condition is satisfied, the log being related to the print data and including a print image of the print data, and the controlling of the storing timings including:
storing the log related to the print data and including the print image in a storage device before printing of the print data is started, when a suspension condition of suspending the printing of the print data is satisfied, and
storing the log related to the print data and including the print image in the storage device after the printing of the print data is started, when the suspension condition is not satisfied
wherein, when storing the log related to the print data in the storage device, the control device is further configured to perform the steps of:
storing identification information, which includes information identifying a first state that is before the start of the printing of the print data and a second state that is after the start of the printing of the print data, in the storage device in relation with the log;
wherein the identification information further includes information identifying whether the printing of the print data is cancelled or not;
the control device is further configured to perform the step of:
determining whether or not to generate a log for a cancel of printing during the first state and the second state based on log managing processing settings that are manually set before the printing of the print data is cancelled.

10. The printing apparatus according to claim 1,
wherein the print image included in the log, which is stored in the storage device before the printing of the print data is started when the suspension condition is satisfied, and the print image included in the log, which is stored in the storage device after the printing of the print data is started when the suspension condition is not satisfied, are the same print image.

11. The printing apparatus according to claim 1,
wherein the control device is configured to determine whether the suspension condition of suspending the printing of the received print data by the printing unit is satisfied based on the received print data.

* * * * *